Feb. 21, 1933.   F. W. GREER   1,898,771
APPARATUS FOR TEMPERING CHOCOLATE
Filed Feb. 28, 1931   3 Sheets-Sheet 1

INVENTOR
Frederick W. Greer,
BY Robt. P. Hains
ATTORNEY

Feb. 21, 1933.   F. W. GREER   1,898,771
APPARATUS FOR TEMPERING CHOCOLATE
Filed Feb. 28, 1931   3 Sheets-Sheet 3

INVENTOR
Frederick W. Greer
BY
Robt. O. Harris
ATTORNEY

Patented Feb. 21, 1933

1,898,771

UNITED STATES PATENT OFFICE

FREDERICK W. GREER, OF CAMBRIDGE, MASSACHUSETTS

APPARATUS FOR TEMPERING CHOCOLATE

Application filed February 28, 1931. Serial No. 519,163.

This invention relates to a novel apparatus for tempering the chocolate of confection coating machines, and while the tempering mechanism of the present invention is designed more particularly for use in coating confections it may be employed for other purposes.

In manufacturing chocolate coated confections or the like, it is often desirable to maintain the chocolate accurately at a definite predetermined temperature, since slight changes in the temperature at which the chocolate is deposited upon the confections will produce changes in the appearance of the finished confections.

In some types of confection coating machines it is desirable to temper the chocolate while it is being delivered from a main supply tank of the coating machine to the discharge point above the confections, and it has therefore been proposed heretofore to provide a jacketed conduit between the main tank and delivery point so that the temperature of the chocolate may be raised or lowered by delivering either steam or cold water to the jacket surrounding the conduit.

These proposed constructions, however, are open to the objection that chocolate is hard to cool quickly due to its high latent heat and tendency to harden upon cooling surfaces, and the jacketed conduits proposed heretofore do not afford sufficient surface area to cool rapidly a stream of hot chocolate passing therethrough. It has also been proposed heretofore to provide a rotating scraper in the jacketed conduit to scrape the walls free of the chocolate that tends to harden upon the chilled walls, but the friction produced by forcing the stream of chocolate through the jacketed conduit and about the scraper has a tendency to increase the temperature of the chocolate thus counteracting to some extent the cooling action of the jacketed conduit.

One of the features of the present invention therefore resides in a novel form of tempering device having a large surface area that is capable of quickly cooling a stream of chocolate or other viscous material passing therethrough.

A more specific feature of the present tempering device resides in a drum-like receptacle provided with jacketed disks secured in close proximity to each other so as to provide a narrow closed chamber between the disks and shaped so that the chocolate passing therethrough will take the form of a relatively thin sheet the temperature of which can be quickly reduced.

It has also been proposed heretofore to automatically control the temperature at which the chocolate is delivered to the goods to be coated by placing the sensitive element of a thermostat control in the path of the chocolate and utilizing the thermostat control to deliver cold water to a jacket conduit when the temperature of the chocolate rises above a predetermined temperature and to deliver steam to the jacket when the temperature of the chocolate falls below the desired temperature.

It is apparent, however, that this automatic temperature control mechanism proposed heretofore can not immediately raise or lower the temperature of the stream of chocolate being supplied to the confections the desired amount, since when either the steam valve or cold water valve is operated by the thermostat element the temperature of the chocolate is likely to be raised slightly above or reduced slightly below the desired temperature. As a result, in the automatic temperature controlled devices proposed heretofore the temperature of the chocolate tends to fluctuate a half degree or so alternately above and below the desired temperature.

A further important feature of the invention resides in a novel apparatus and method of operation whereby said fluctuation of the temperature above and below the desired temperature is avoided and a much more accurate temperature control is secured than heretofore.

This new and highly desirable result is secured by maintaining the chocolate in the main supply tank at a temperature slightly above the temperature at which it is to be deposited upon the goods and by utilizing the jacketed tempering device to reduce the temperature of the chocolate the desired amount as it is delivered to the goods. In other words the heating of the chocolate is effected before it leaves the main supply tank and the sole function of the jacketed tempering device is to cool the chocolate to the desired temperature, with the result that a highly accurate control of the temperature of the chocolate delivered to the goods is secured. Furthermore since the chocolate in the main supply tank is maintained several degrees above the temperature at which it is applied to the goods it will be kept well melted and free from lumps.

The various features of the invention will be further understood from the following description when read in connection with the accompanying drawings which illustrate one good practical form of the invention.

In the drawings:—

The tempering features of the present invention may be employed for various purposes but are designed more particularly for use in connection with chocolate coating machines, and are therefore shown in connection with a chocolate coating machine which for the most part is of well known construction and operates in a well known manner.

Figure 1:
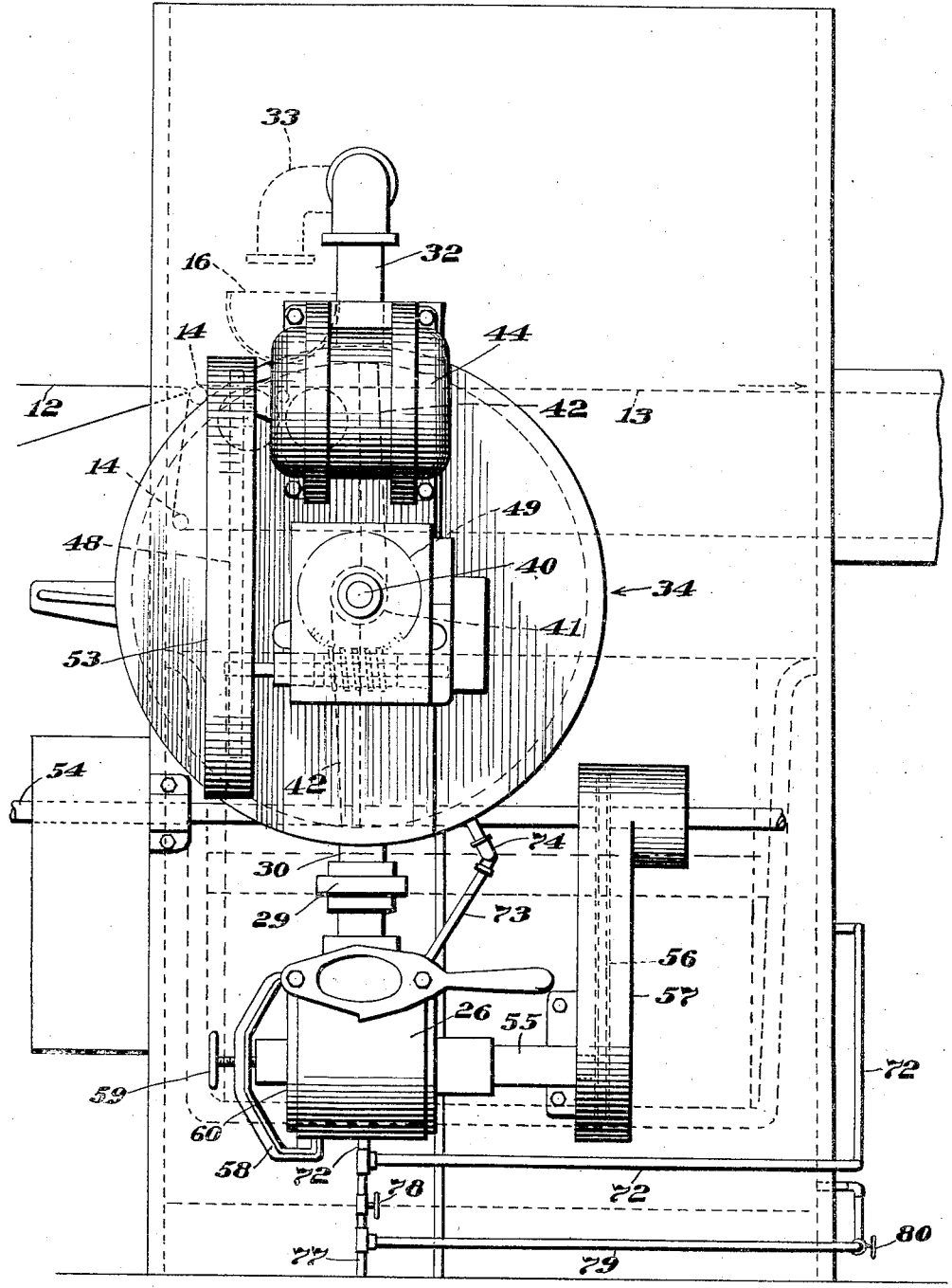
Fig. 1 is a side elevation of a chocolate coating machine having associated therewith a tempering device constructed in accordance with the present invention.
Figure 2:
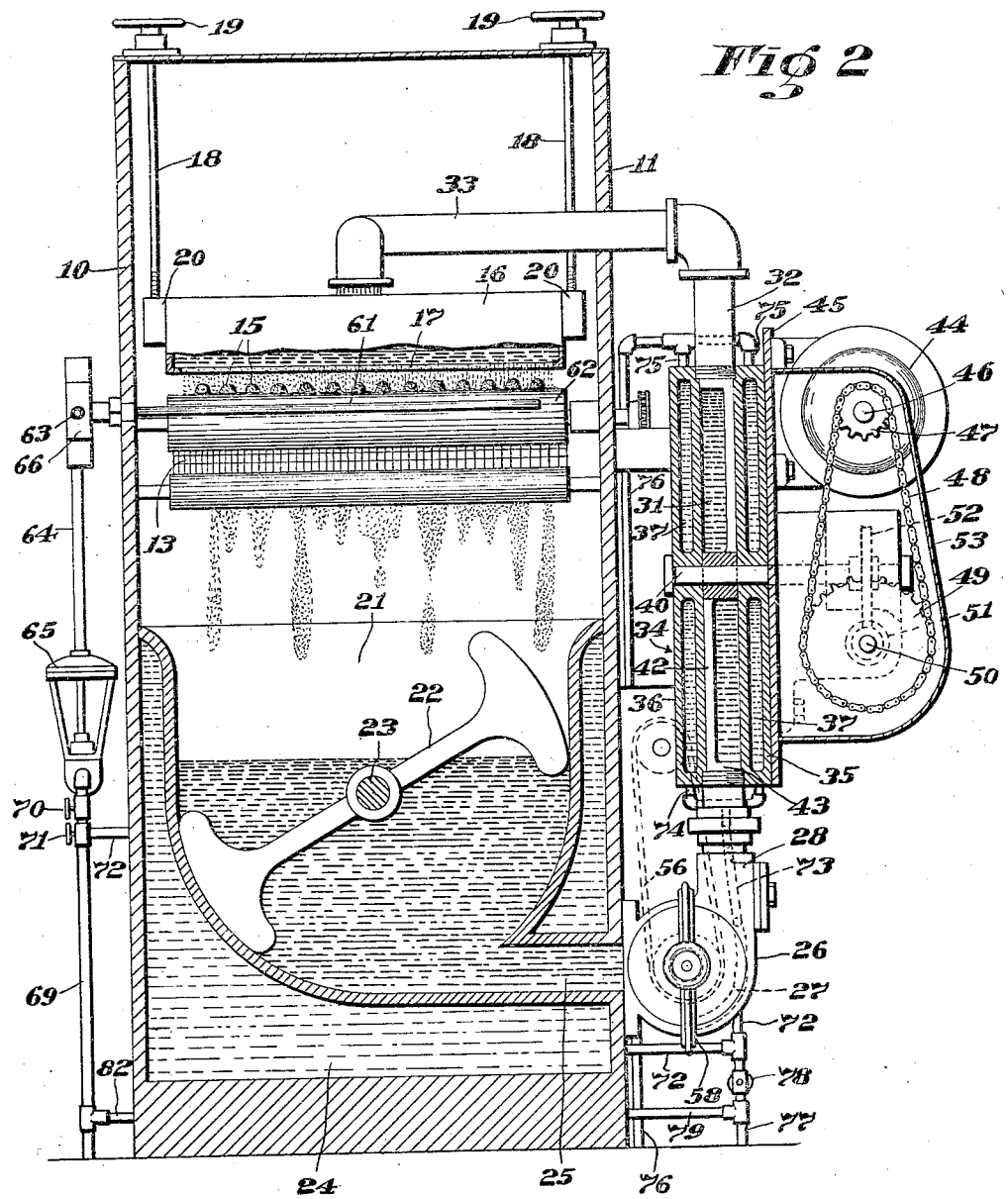
Fig. 2 is a vertical sectional view through the coating machine of Fig. 1.
Figure 3:
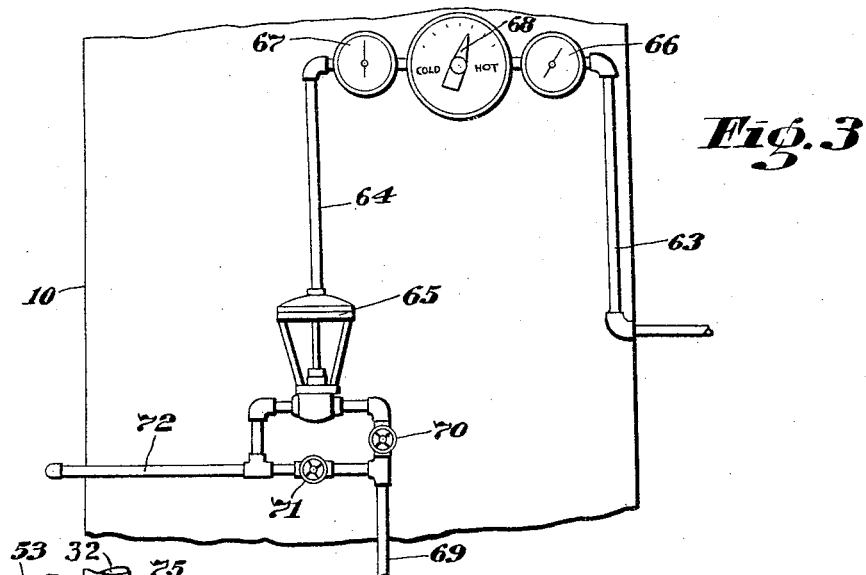
Fig. 3 is a view of a portion of the opposite side of the machine from that shown in Fig. 1 and illustrates the thermostat control mechanism.
Figure 4:
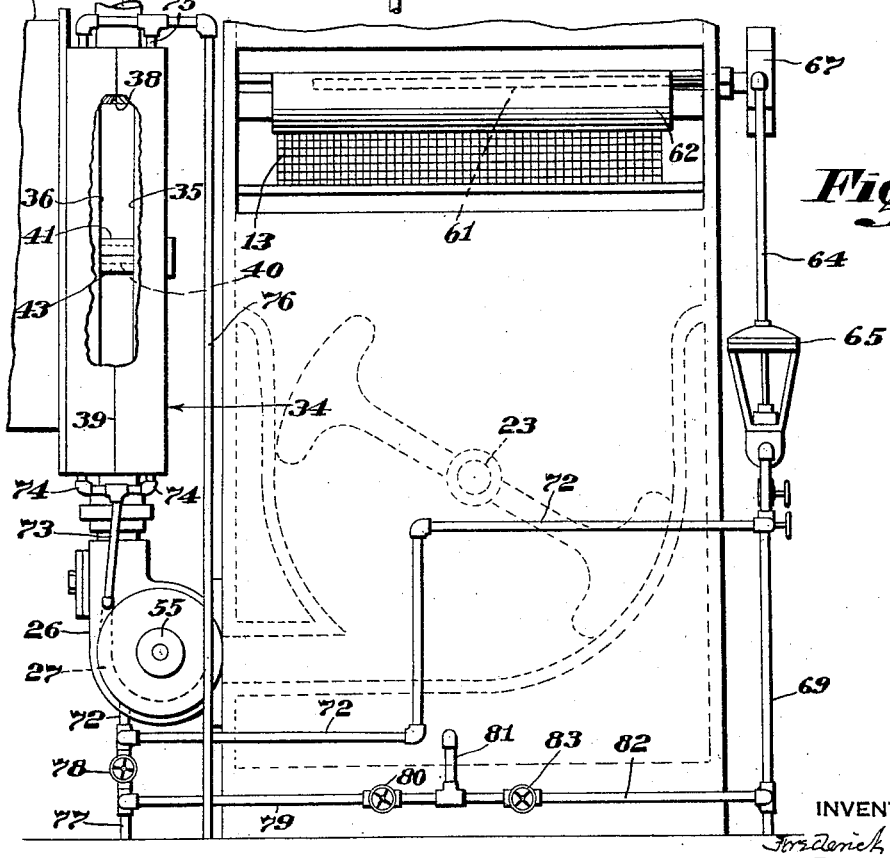
Fig. 4 is a rear elevation of the lower portion of the machine of Fig. 1.

The coating machine illustrated comprises a closed casing having the opposite side walls 10 and 11 to which the end walls and top of the casing are secured. The candy, cakes, or other articles to be coated and which are frequently termed "centers," are delivered to the coating machine by an endless belt or apron 12, which is positioned to deliver such articles to the upper run of a wire conveyor apron 13 supported by the rollers 14. The wire apron 13 may be of the usual construction and serves to advance the articles 15 to be coated beneath a chocolate depositing pan or shower pan 16 of the usual or any preferred construction and which is shown as having the chocolate discharge slot 17 extending practically entirely across the conveyor apron 13, as shown in Fig. 2. The shower pan 16 may be supported by the hand threaded rods 18 provided with the hand wheels 19 at their upper ends, the arrangement being such that the hand wheels may be rotated to turn the rods 18 in the nuts 20 secured to the shower pan to thereby raise and lower the chocolate depositing pan 16 with respect to the apron 13. The excess chocolate or other coating material which passes through the conveyor apron 13 falls into the main supply tank 21 in which is mounted the stirrer 22 that is secured to the operating shaft 23. The tank 21 is provided with the water jacket 24 adapted to be supplied with either cold water or steam to maintain the coating material within the supply tank at the desired temperature.

As hereinbefore stated it is desirable to control accurately the temperature at which the chocolate is applied to the confections 15, since slight changes in the temperature of the chocolate will change the appearance of the finished goods. The present invention therefore contemplates a construction in which a jacketed tempering chamber of relatively large surface area is provided between the main supply tank 21 and the shower pan 16, the arrangement being such that a stream of chocolate pumped from the main supply tank to the shower pan will be forced through the tempering chamber of the present invention to thereby temper the chocolate delivered to the goods.

In the construction shown the chocolate passes from the lower portion of the main supply tank 21 through the conduit 25 to a pump 26 which may be of the usual or any preferred construction. The lower arcuate portion of the pump 26 is preferably provided with the water jacket 27 and this pump has the discharge portion 28 which is shown as connected by the universal joint 29 and nipple 30 to a threaded opening formed in the periphery of the chocolate receiving chamber 31 of the tempering device of the present invention. The chocolate upon passing through the chamber 31 of the tempering device is discharged from the upper end thereof through the pipe 32 having threaded engagement with the peripheral portion of the chocolate chamber and the chocolate is delivered by the pipes 32, 33, to the shower pan 16.

It is much easier to raise the temperature of chocolate the desired number of degrees than to cool the chocolate a corresponding number of degrees, since chocolate may be quickly heated by delivering steam to the water jacket surrounding the chocolate containing chamber but a large mass of chocolate cannot be quickly cooled by supplying cold water to a jacket surrounding the mass of chocolate due to the high latent heat of chocolate and the tendency of the chocolate to harden or solidify upon the chilled walls of the container. The jacketed conduits employed heretofore therefore do not afford sufficient surface area to quickly reduce the temperature of the stream of chocolate being forced therethrough to the chocolate depositing means. In order to overcome this defect of the prior constructions the tempering device of the present invention is constructed to provide a jacketed tempering chamber of large surface area, the arrangement being such that the chocolate passing through the tempering chamber takes the form of a relatively thin sheet which can be quickly cooled by the jacketed walls with which it contacts.

In the construction shown the tempering device of the present invention has the form of a narrow drum-like receptacle 34 formed of the jacketed disks 35, and 36, each disk being provided with a water jacket 37. The circular chocolate receiving chamber 31 is conveniently formed between the jacketed disks 35 and 36 by providing each of these disks with an inwardly extending annular flange 38 adapted to form the closed chocolate chamber 31 and to maintain the disks 35 and 36 spaced apart the desired distance. The contacting edges 39 of the annular flanges 38 may be welded or otherwise secured together to form a fluid tight joint.

It is desirable to provide a rotating stirrer or scraper in the chocolate chamber 31 to keep the chocolate thoroughly stirred or mixed and to scrape from the inner faces of the jacketed disks 35 and 36 and from the annular wall of the chamber 31 the chocolate that tends to deposit or harden thereupon. The narrow, drum-like receptacle 34 is therefore shown as having the stirrer driving shaft 40 journaled in a central portion of the drum, as shown, and to this shaft is secured within the chamber 31 the stirrer having the hub 41 keyed or otherwise rigidly secured to the shaft 40 and this hub is provided with the oppositely extending scraper blades 42. Each of these blades, it should be noted, is bent laterally at its outer end as indicated at 43 to provide a portion adapted to scrape the circular periphery of the chocolate receiving chamber 31.

It will be apparent from the foregoing that the chocolate tempering receptacle 34 of the present invention provides a tempering chamber 31 of large surface area and relatively large capacity, as compared with the cross sectional area, of the chocolate supply pipe 30 and pump 26, so that the speed at which the mass of chocolate within the chamber 31 flows therethrough will be very much reduced with respect to the speed at which the stream of chocolate passes through the pipe connections 30, 32, and 33, and as a result the time during which the chocolate is subjected to the cooling action of the tempering device 34 is increased. Furthermore since the chocolate while in the chamber 31 is spread out in a relatively thin sheet of large area its temperature will be rapidly reduced under the cooling action of the jacketed disks 35 and 36. As a result of the construction just described the temperature of the chocolate may be reduced much more rapidly in the tempering device of the present invention than in the jacketed conduits employed heretofore.

Various means may be employed for driving the shaft 40 to rotate the stirrer within the chamber 31 and while this shaft may be readily operated from a going portion of the chocolate coating machine, the present invention contemplates a construction whereby the stirrer 42 is driven by a small, electric motor 44 the base of which is shown as bolted to a supporting plate 45 fastened to the outer face of the jacketed disk 35. The shaft 46 of the motor 44 is provided with the sprocket 47 adapted to drive the chain 48 which in turn drives the larger sprocket 49 secured to the shaft 50 that is provided with a worm 51 adapted to drive a worm wheel 52 secured to the shaft 40. The driving mechanism just described is preferably enclosed in the protecting casing or housing 53 secured to the supporting plate 45.

The operating parts of the chocolate coating machine may be driven as usual from the main power shaft 54. In the construction shown the power shaft 55 of the pump 26 is driven from the power shaft 54 by the sprocket chain 56 which is preferably enclosed in the casing 57. It is desirable to secure access to the chocolate chamber of the pump 26 from time to time and this is readily accomplished by providing the spanning bar 58 and having the hand wheel 59 which is adapted to removably secure the end plate 60 of the pump in place.

While it has been proposed heretofore to control the temperature of chocolate passing through a tempering device by automatically delivering cold water or steam to the tempering device, applicant has found that a better and more accurate control of the temperature of the chocolate can be secured by employing the jacketed tempering device solely as a chocolate cooling means, instead of both as a heating and cooling device as heretofore.

An important feature of the present invention therefore resides in the construction and method of operation whereby the temperature of the chocolate within the main supply tank is maintained several degrees higher than the temperature at which the chocolate is to be deposited upon the goods and utilizing the tempering device of the present invention solely to reduce the temperature of the chocolate to the point at which it is to be applied to the goods. In this manner a highly accurate control of the temperature of the chocolate being delivered to the goods is secured.

It is desirable to control automatically the cooling water supplied to the jacket 27 of the pump and to the jackets of the disks 35 and 36. This may be accomplished through the employment of a thermostatic control of well known construction and provided with a sensitive element adapted to be mounted at any desired point within the stream of chocolate being supplied to the goods. In the construction shown the sensitive element 61 is mounted below and in close proximity to the upper run of the apron 13, the arrangement being such that this element 61 is supported in the valley formed between the pair of rollers 62 supported below the apron to facilitate the depositing of the chocolate upon the bottom of the centers 15. The construction of the sensitive element 61 of the thermostat is such that it controls the air delivered by the compressed air pipe 63 to a pipe 64, leading to the direct action diaphragm valve 65. The pressure of the air supplied by the pipe 63 is indicated by an air pressure gage 66 and the pressure of air within the pipe 64 is indicated by a similar air pressure gage 67. The thermostat control may be adjusted by rotating the hand wheel having the pointer 68 to maintain the chocolate delivered to the goods at any desired temperature.

The function of the automatic device just described is to control the amount of cooling water delivered to the jacket 27 of the pump and to the jackets 37 of the disks 35 and 36. Cooling water is supplied to the diaphragm valve 65 by a pipe 69 leading from the cold water supply of the building in which the present device is installed. A hand valve 70 is provided for cutting off the flow of the water from the pipe 69 to the diaphragm valve 65 and should it be desired to manually control the supply of water to the jackets just mentioned this may be accomplished by closing the valve 70 and opening the valve 71 provided in a by-pass connection between the pipe 69 and the pipe 72 leading to the jacket 27 of the pump 26. The cooling water passes from the upper portion of the jacket 27 through a pipe 73 to the branch pipes 74 leading to the water jackets 37, and water is discharged from the upper portion of these jackets by the pipes 75 connected to the overflow pipe 76. The arrangement just described is such that the flow of cool water to the jackets 27 and 37 may be controlled either manually by operating the hand valves 70, 71, or automatically by the diaphragm valve 65.

When a chocolate coating machine equipped with the present invention has been allowed to stand idle for some length of time or over night the chocolate in the pump and tempering chamber 31 may be chilled, in which case it may be desirable to deliver steam to the jackets 27 and 37 to melt the chocolate. This may be readily accomplished by providing the steam supply pipe 77 leading from any suitable source of steam supply and which is connected to the pipe 72 leading to the jacket 27, the hand valve 78 being provided to control the flow of steam to the jacket 27.

It may be desirable to heat the water in the jacket 24 of the main supply tank during the normal operation of the coating machine or when starting up a machine after it has been allowed to stand idle. Steam may therefore be supplied to the jacket 24 by the pipe 79 having the hand valve 80 for controlling the steam delivered by the pipe 81 leading to the jacket 24. The temperature of the water within the jacket 24 may be reduced by admitting cold water to this jacket through the pipe 82 leading from the water supply pipe 69, the hand valve 83 being provided to control the flow of water from the pipe 82 to the pipe 81. The temperature of the chocolate within the main supply tank 21 may be maintained several degrees higher than that at which the chocolate is deposited upon the goods by admitting steam to the jacket 24 from time to time or by adding a fresh supply of chocolate to this tank from time to time at a relatively high temperature, and the tempering device 34 serves to effect the desired drop in the temperature of the chocolate as it is delivered to the goods.

What is claimed is:—

1. In a coating machine, in combination, a confection conveyor, a main chocolate supply tank, means above the conveyor for depositing chocolate upon the confections, pump means for delivering chocolate in a continuous stream from the supply tank to the depositing means, and a compact tempering device of large surface area connected between the pump and depositing means for a pressure feed therebetween and comprising a closed drum-like receptacle provided with jacketed disks disposed in close proximity to each other and connected to form a narrow chocolate tempering chamber between the disks.

2. In a coating machine, in combination, a confection conveyor, a main chocolate supply tank, means above the conveyor for depositing chocolate upon the confections, pump means for delivering chocolate from the supply tank to the depositing means, and a compact tempering device of large surface area connected between the pump and depositing means for a pressure feed therebetween and comprising a closed drum-like receptacle provided with jacketed disks disposed in close proximity to each other and connected to form a narrow chocolate tempering chamber between the disks and through which the chocolate is forced by the pump.

3. In a coating machine, in combination, a confection conveyor, a main chocolate supply tank, means above the conveyor for depositing chocolate upon the confections, pump means for delivering chocolate from the supply tank to the depositing means, and a compact tempering device of large surface area connected between the pump and depositing means for a pressure feed therethrough and comprising a closed drum-like receptacle provided with jacketed disks disposed in close proximity to each other and connected to form a narrow chocolate tempering chamber between the disks and through which the chocolate is forced by the pump, and means for automatically controlling a heat exchange fluid supplied to said jackets.

4. In a chocolate conditioning machine, in combination, a confection conveyor, a supply tank, a second tank above the conveyor, pump means for delivering the chocolate from the supply tank to said second tank, a compact tempering device of large surface area interposed between the supply tank and second tank and comprising a closed drum-like receptacle provided with jacketed side walls disposed in close proximity to each other and connected to form a narrow chocolate tempering chamber between said walls, and pipe connections between the pump and tempering chamber and leading from said chamber to said second tank to supply the chocolate properly tempered to the second tank.

5. In a coating machine, in combination, a confection conveyor, a main coating supply tank below the conveyor, means above the conveyor for depositing coating material upon the confections, pump means for delivering coating material from the supply tank to the depositing means, and a closed tempering device of large surface area connected between the pump and depositing means for a force feed through said device and comprising a closed drum-like receptacle provided with jacketed side walls and constructed to form a narrow, circular, tempering chamber the diameter of which is several times greater than the distance between said walls.

6. In a coating machine, in combination, a confection conveyor, a main chocolate supply tank, means above the conveyor for depositing chocolate upon the confections, pump means for delivering chocolate from the supply tank to the depositing means, a cooling device of large surface area connected between the pump and depositing means for a force feed through the device and comprising a closed drum-like receptacle provided with jacketed disks disposed in close proximity to each other and connected to form a narrow chocolate tempering chamber between the disks, means for heating the chocolate in said tank to a temperature above that at which it is to be delivered to the confections, means for supplying cooling water to said jacket, and thermostatic means for automatically controlling the cooling action of said device upon the chocolate passing therethrough to the depositing means.

7. In a coating machine, in combination, a confection conveyor, a main chocolate supply tank, means above the conveyor for depositing chocolate upon the confections, pump means for delivering chocolate from the supply tank to the depositing means, a compact tempering device of large surface area mounted adjacent a side wall of the machine in an upright position and comprising a closed drum-like receptacle provided with jacketed disks disposed in close proximity to each other and connected to form a narrow chocolate tempering chamber between the disks, a pipe connection from the pump to the lower portion of said chamber and a second pipe connection from the upper portion of said chamber to the depositing means for a force feed through said device, a combined stirrer and scraper mounted in said device to revolve upon a horizontal shaft, and power means for driving said shaft.

In testimony whereof, I have signed my name to this specification.

FREDERICK W. GREER.